July 19, 1932.   C. A. MASSOLL   1,867,671
SAFETY ZONE GUARD
Filed Sept. 8, 1931
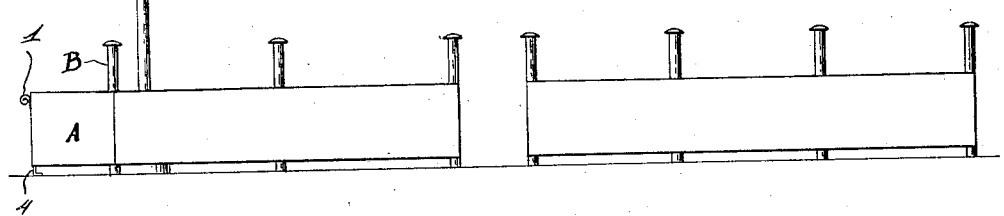
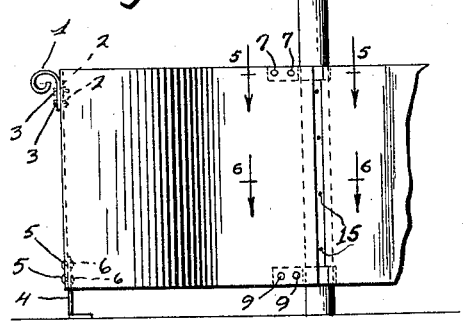
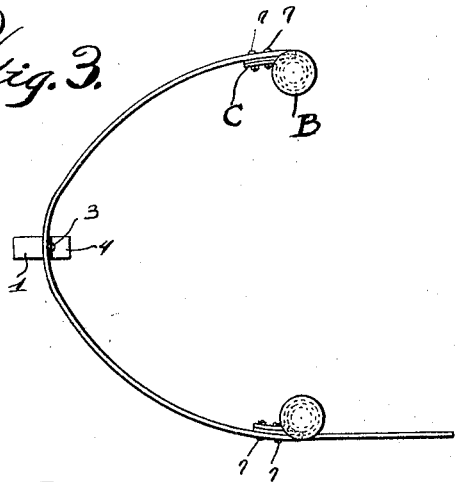
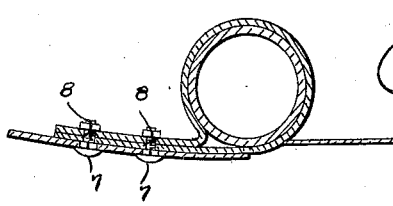
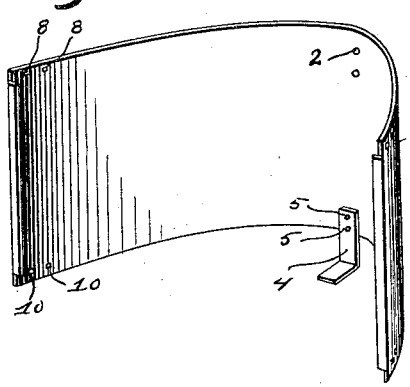
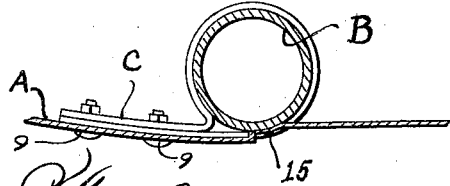
INVENTOR
Curtis A. Massoll
BY
Samuel C. Thomas
ATTORNEY Patented July 19, 1932

1,867,671

UNITED STATES PATENT OFFICE

CURTIS A. MASSOLL, OF DETROIT, MICHIGAN

SAFETY ZONE GUARD

Application filed September 8, 1931. Serial No. 561,712.

My invention relates to safety devices designed to protect both pedestrians and motorists. Briefly, it is a metal guard, parabolic in form. It is supported at the point by a metal leg resting upon the pavement or resting in a groove cut into the pavement. It is attached to the safety zone or other obstruction. The metal guard, being parabolic in shape, when struck by a vehicle, will absorb part or all of the shock caused by the impact, thus constituting a protection to both the vehicle and driver striking the guard, and also protecting the safety zone and pedestiran in the zone from damage.

I attain these objects by the mechanism illustrated in the accompanying drawing, in which:

Figure 1 is a side elevation of the entire safety zone with the guard attached. The guard can, of course, be attached to any other type of street obstruction.

Figure 2 is a fragmentary elevation of the guard attached to the end post of a safety zone.

Figure 3 is a plan view of the guard, showing the guard attached to the end post of the safety zone.

Figure 4 is a view in perspective of the guard and supporting leg detached from the end posts of the safety zone.

Figure 5 is a detail of the metal upper anchor clamps by which the guard is attached to the upper portion of the end posts of the safety zone or to post affixed to other types of street obstructions.

Figure 6 is a detail of the lower anchor clamps by which the guard is attached to the lower portion of the said end posts.

Similar numerals refer to similar parts throughout the several views:

A curved overhanging fender is secured at the medial point of the upper portion of the guard member or plate A, by bolts, 3, 3, which pass through bolt holes, 2, 2, in guard member. The overhanging fender 1 is designed to prevent a vehicle driven at a high rate of speed from climbing or riding over the top of the guard member by catching the bumper of the vehicle.

An L-shaped leg, 4, rests on the pavement, or in a groove cut into the pavement wide enough to permit the leg to travel easily in the groove towards the safety zone when the guard member is struck by a moving vehicle. The leg is attached to the guard by bolts, 5, 5, which pass through bolt holes, 6, 6, cut in the guard.

The guard member A, is rigidly secured to the respective end-posts B B,—at the inner and outer edge of the safety zone,—by strap anchors C C, in turn secured to the guard plate A, by bolts 7 7, extending through bolt holes 8 8, in the strap anchors at the top of the guard member, and at the bottom of said guard member by bolts 9 9 extending through holes 10 10 in the anchors and guard member or plate.

The parabolic barrier plate A is fixedly attached to the spaced barrier posts B B at the end and each side of the safety zone by anchor straps, as previously described, and the adjacent plates are secured by bolts 15, see Figures 2 and 6.

Having thus described my invention, what I claim is:

1. A safety zone protecting device, comprising barrier posts respectively located adjacent to lines bounding opposite sides of the safety zone; a sheet metal barrier plate bent to a substantially parabolic form to provide a resilient barrier across the end of the zone; and means for securing the ends of said barrier plate to the barrier posts, comprising a plurality of anchor strips encircling and rigidly secured to the barrier posts and to the marginal edges of the barrier plate.

2. A safety zone protecting device, comprising barrier posts respectively located adjacent to lines bounding opposite sides of the safety zone; a sheet metal barrier plate bent to a substantially parabolic form to provide a resilient barrier across the end of the zone; means for securing the ends of said barrier plate to the barrier posts, comprising a plurality of anchor strips encircling and rigidly secured to the barrier posts and to the marginal edges of the barrier plate, and an outwardly extending guard secured adjacent the upper edge of said barrier plate to arrest the climbing movement of a vehicle over said plate.

3. A safety zone protecting device, comprising barrier posts respectively located adjacent to lines bounding opposite sides of the safety zone; a sheet metal barrier plate bent to a substantially parabolic form to provide a resilient barrier across the end of the zone; means for securing the ends of said barrier plate to the barrier posts, comprising a plurality of anchor strips encircling and rigidly secured to the barrier posts and to the marginal edges of the barrier plate, and a supporting leg secured to the lower edge of said barrier plate and adapted to movably rest on the ground adjacent said safety zone.

CURTIS A. MASSOLL.